Dec. 21, 1954  B. B. WHITTAM  2,697,578
VIBRATION MOUNTING
Filed May 4, 1951  2 Sheets-Sheet 1

INVENTOR
Benjamin B. Whittam
BY
ATTORNEYS

Dec. 21, 1954     B. B. WHITTAM     2,697,578
VIBRATION MOUNTING
Filed May 4, 1951     2 Sheets-Sheet 2
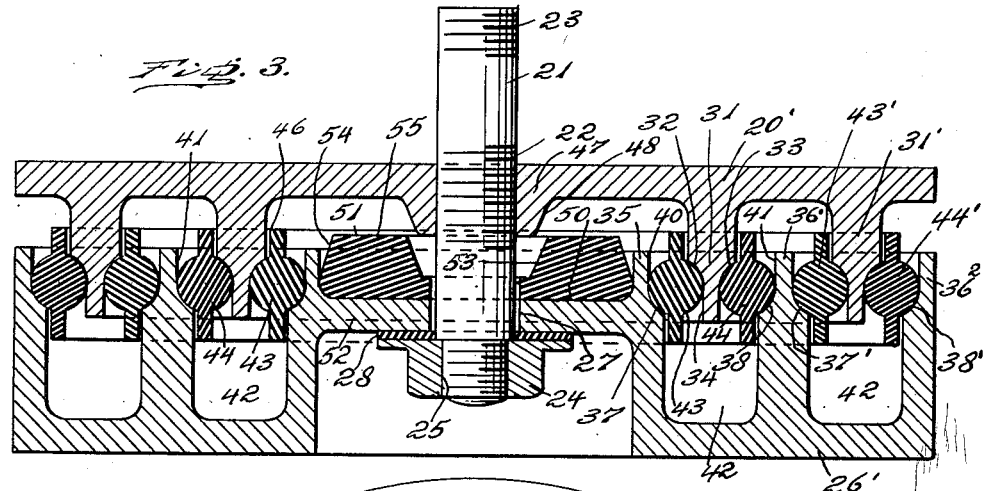
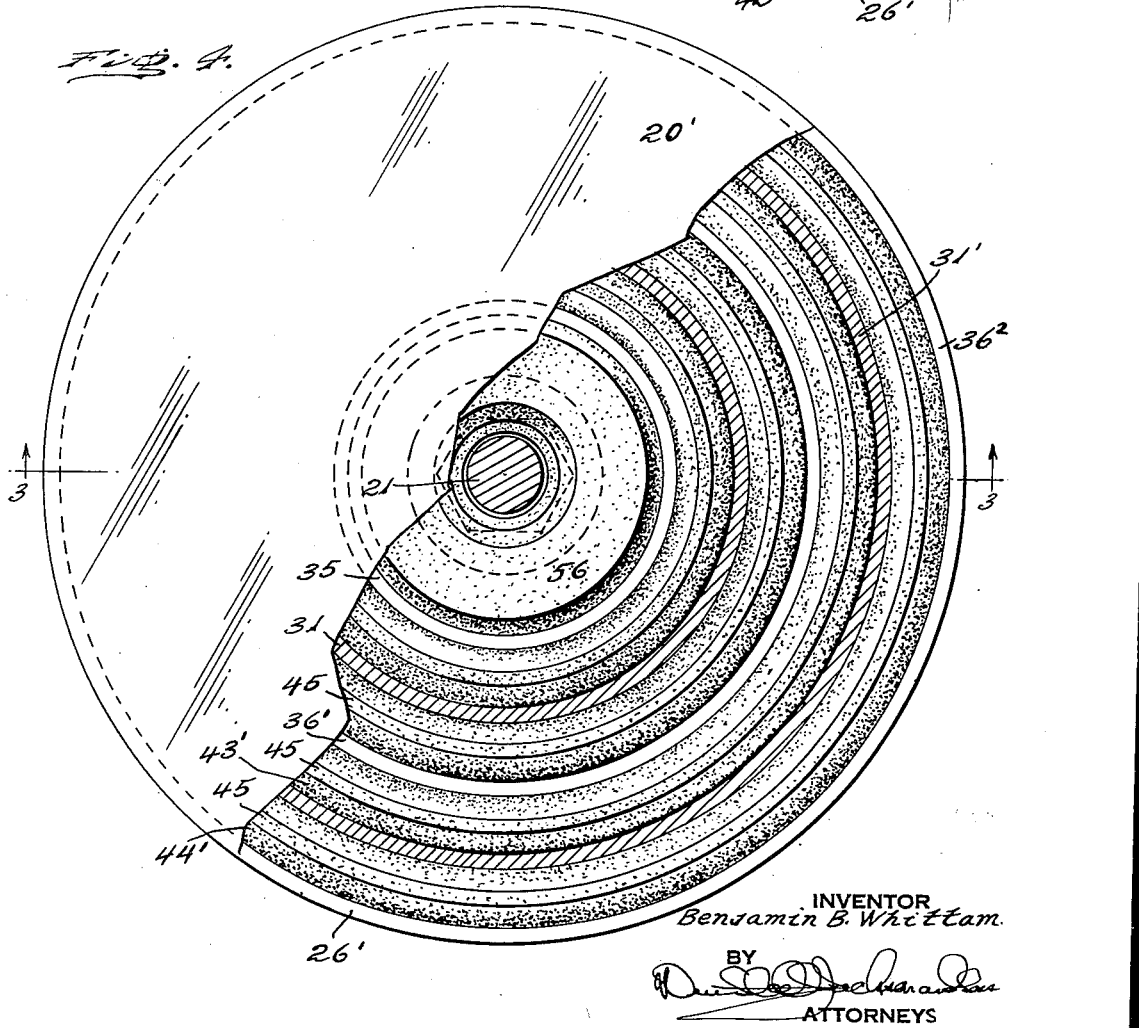
INVENTOR
Benjamin B. Whittam.
BY
ATTORNEYS

United States Patent Office 2,697,578
Patented Dec. 21, 1954

2,697,578

VIBRATION MOUNTING

Benjamin B. Whittam, Doylestown, Pa.

Application May 4, 1951, Serial No. 224,483

4 Claims. (Cl. 248—358)

The present invention relates to vibration mountings.

The present application concerns a further development of the subject matter of my U. S. application Serial No. 626,005, filed November 1, 1945, for Roll-Shear Vibration Isolation Mounting, now U. S. Patent 2,560,620, granted July 17, 1951. The subject matter of this earlier application is hereby incorporated into the present application by reference.

A purpose of the invention is to permit the support of heavier loads, and permit the operation under greater vibration forces.

A further purpose is to produce a heavy duty vibration mounting.

A further purpose is to avoid the necessity of cementing rubber elements to metal in a vibration mounting.

A further purpose is to obtain greater temperature ranges of operation in a vibration mounting.

A further purpose is to permit substantially equal freedom in all planes of vibration.

A further purpose is to reduce the load on the roll-shear gaskets and thereby increase their life.

A further purpose is to mount roll-shear shoulders on both the radial inner and outer sides of an annular rib on either the hub or the base and engage the shoulders on the two sides by roll-shear gaskets.

A further purpose is to extend skirts axially in one or both directions from the roll-shear gaskets in spaced relation to annular ribs on the hub and the base, and engaging the ribs when roll-shear takes place.

A further purpose is to seal air in a well by the roll-shear gaskets and to compress the air when the hub moves closer with respect to the base.

A further purpose is to distort a shock gasket under impact desirably by wedging a tapering shoulder of the hub against a tapering edge of the shock gasket.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

Figure 3 is a section of a variant of the mounting according to the invention, the section being taken on the line 3—3 of Figure 4.

Figure 4 is a top plan view of Figure 3, with the hub and bolt partially broken away.

Figure 1:
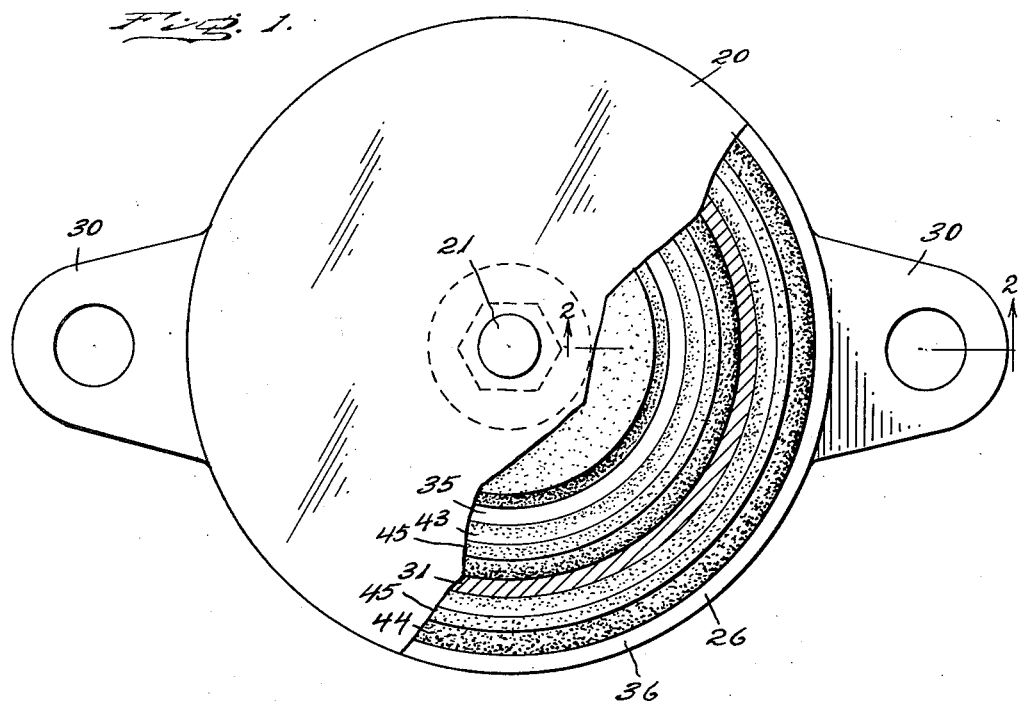
Figure 1 is a top plan view, partially broken away, showing the preferred embodiment of the invention.

Describing in illustration but not in limitation and referring to the drawings:

In the prior art it has been the usual practice to construct vibration mountings by cementing or otherwise fixing rubber elements to the hub and to the base. This is not only tedious and expensive, but it limits the range of usefulness of the device, particularly at extremes of temperature. One of the important features of the present invention is that the gaskets are free and not cemented to the hub or to the base, so that the device will function under conditions in which cement will not remain adhering, and also can be produced without the inconvenience incident to cementing.

The fundamental principle according to which the device of the invention operates is one of roll-shear deformation when the hub moves with respect to the base, as explained in detail in my copending patent application above referred to. This provides nearly equal freedom in all planes of vibration, so that the functioning of the device is not limited by any means to mere axial vibration or mere radial vibration.

When the device tends to deform, the shoulders on the hub move with respect to the shoulders on the base and the rubberlike gaskets roll and concurrently deform, damping the vibration. Skirts around the top and bottom of the gaskets engage ribs under deformation and this increases the resistance to further rolling and tends to restore the device to its static position.

I have discovered that an improved heavy duty vibration mounting can be made by locating the rubberlike roll-shear gaskets concentrically one around another, and desirably employing both the inside and the outside of an annular rib on the hub or on the base to carry roll-shear shoulders. Thus the roll-shear gasket can be supported between inner and outer roll-shear shoulders mounted on ribs extending from the hub or the base, as the case may be.

This new construction has great advantages on heavy duty service, since it is possible to make a very flat housing, economical of vertical space, on which the equipment can be mounted. It is thus possible to reduce the load on a particular gasket, and thus increase the life of the gasket. Combinations of damping properties can also be evolved, since gaskets can be substituted for those of different durometers and in fact roll-shear gaskets of different durometers can be used in the same combination.

The resilient gaskets are made to form air seals on a compression well, and the force of the compressed air in the well is employed to restore the mounting to its mid position.

In order to limit the deformation under shock load, I desirably provide an annular wedge surface on the hub which engages a similar surface on a rubberlike shock pad, absorbing the shock by annularly stretching the shock pad.

Figure 2:
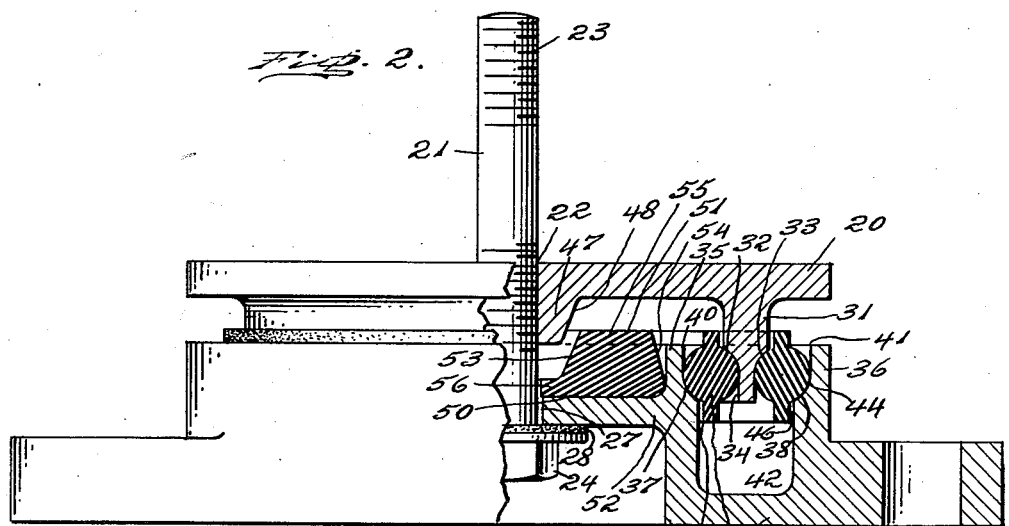
Figure 2 is a side elevation of Figure 1, partially in section on the line 2—2.

Considering first the form of Figures 1 and 2, I illustrate a hub 20 suitably of steel or other structural metal which has rigidly secured thereto a bolt 21. Any desired method of attaching the bolt to the hub may be used, the preferred attachment being by threads 22 which suitably extend to one end of the bolt. The bolt is used to attach an instrument or other piece of equipment to the hub, and for this purpose has threads 23 to receive a suitable nut (not shown). The threads 23 may if desired be merely an extension of the threads 22.

The bolt desirably extends in the direction opposite to the threads 23 and carries a head 24 which is suitably in the form of a nut, threaded on to a reduced portion 25 at the end of the bolt as shown in Figure 3.

A base 26 of steel or other suitable structural metal cooperates with the hub and has an opening 27 through which the bolt passes with adequate freedom so that the hub can have the maximum desired movement with respect to the base without engaging the base at the opening 27. To guard against a violent upsurge, a snubbing washer 28 suitably of rubber is provided between the base and the head 24 of the bolt.

In case it is desired to suspend the load below the base instead of mounting the load on the hub, it will be evident of course that the load can be fastened on the threaded end 25 to replace the nut 24, or the bolt can be reversed to extend down for a suitable distance.

The base is mounted to the supporting structure of an airplane, building or other equipment in any suitable way, as by lugs 30 having suitable bolt openings. For convenience in illustration, the lugs have been omitted from the form of Figures 3 and 4.

The hub 20 is provided with an axially extending annular rib 31 directed toward the base and concentric with the axis of the bolt. The rib has an inwardly directed annular shoulder 32 and an outwardly directed annular shoulder 33. The two shoulders have a cross sectional configuration which is recessed and desirably curved. The curve shown is a portion of the circumference of the circle of the cross section of the roll-shear gasket. From the end of the rib 31 remote from the hub to the shoulder, the rib tapers slightly at 34, being thinnest at the remote end and widening slightly as it approaches the shoulders.

The base has axially directed inner and outer ribs 35 and 36 which are concentric with the axis of the bolt and are of different diameters, one smaller and one larger than the diameter of the rib 31 on the hub. The inner rib 35 on the base has an outwardly directed annular shoulder 37 and the outer rib 36 has an inwardly directed annular shoulder 38. The shoulders 37 and 38 are of recess cross section, preferably curved and desirably conforming to the circle of the cross section of the roll-shear gasket as shown. From the ends nearest to the hub, to the shoulders, the ribs 35 and 36 taper slightly at 40 and 41 respectively, being narrowest at the ends and widening toward the shoulders.

Between the ribs 35 and 36 an air-tight well 42 is formed in the base which serves to compress air under downward movement of the hub during vibration and thus provides a restoring force.

Endless resilient gaskets 43 and 44 are positioned in contact with the respective shoulders on the base and the hub. The gaskets are round, concentric with the bolt and of different diameters, the inner gasket 43 engaging the outer roll-shear shoulder 37 of the inner rib 35 of the base on the inside and engaging the inner roll-shear shoulder 32 of the rib 31 of the hub on the outside. The outer gasket 44 engages the outer roll-shear shoulder 33 of the rib 31 on the hub on the inside and engages the inner roll-shear shoulder 38 of the outer rib 36 of the base on the outside.

The cross sections of the roll-shear gaskets are desirably circular as shown, but extending axially at the tops and bottoms are annular skirts 45 integral with the gaskets and extending up and down normally in spaced relation at 46 from the respective adjoining ribs, so that when roll-shear takes place in the direction to move a skirt toward a rib the skirt tends to limit roll-shear and provide a restoring force.

The roll-shear gaskets may be made of any suitable rubberlike material, examples being natural rubber or synthetic rubber such as Buna S, Buna N or Thiakol. The durometer used may suitably vary between 20 and 75, the durometer frequently being in the range of between 40 and 50. With a durometer between 40 and 50, the load carried on a vibration mounting of the character of Figures 1 and 2 may be as high as 1850 pounds with a 3/16 inch deflection.

The rubber making up the gasket rings 43 and 44 will normally be solid and not sponge rubber, especially where the vibration mounting is to be employed on heavy-duty service.

The contour of the various annular elements, such as the ribs and the roll-shear gaskets as shown is circular, but it will be evident that any other suitable closed configuration, such as an oval or a rectangle (suitably with round corners) may be used for the horizontal outline of the ribs and roll-shear gasket rings.

The gasket rings, when in position as best seen in Figure 2, are slightly squeezed radially, the normal free radial cross section of the gasket ring being slightly wider than the cross section when the ring is in place in the shoulders. This squeezing or crowding is accomplished by the slight taper at 34, 40 and 41 on the ribs, since in assembly the hub and base are desirably forced axially together on the roll-shear gasket rings, and as the roll-shear gasket rings move along the taper slight lateral squeezing takes place. Thus there is no play or initial freedom between the roll-shear gasket rings and the shoulders.

While the roll-shear gasket rings form the primary damping elements and function to absorb the vibration load in both horizontal and vertical planes, it is desirable to provide an additional shock resistance to withstand impact.

The hub 20 has a central annular hub extension 47 toward the base near the center, and the hub extension suitably is provided with an outside annular tapered surface 48 which is small in diameter close to the base and enlarges progressively as it extends away from the base.

The base has a recess 50 in line with the hub extension 47, and the recess holds annular shock pad 51 which fits on a bottom portion 52 of the base inside the rib 35 and around the bolt. The shock pad 51 has an interior annular tapered surface 53 which conforms with the tapered surface 48 so that when the hub moves toward the base it will encounter the shock pad over the tapered surface 53 and tend to squeeze the shock pad outwardly. The shock pad also has a reverse tapered outside portion 54, leaving room for external expansion, and has freedom at its flat top portion 55 for extension toward the hub by deformation after the tapered surfaces 48 and 53 engage. A small inward extension 56 on the shock pad engages the end of the extension 47 if the hub is able to move far enough toward the base by distorting the shock pad to make engagement with the portion 56.

The shock pad will desirably be of rubberlike material of any of the characters of which the roll-shear gasket is made, but decidedly softer than the roll-shear gasket. Unlike the roll-shear gasket the shock pad will desirably be made of sponge rubber. The durometer of the shock pad will normally be between 10 and 30 and will normally be at least 10 points softer than the roll-shear gasket.

In operation, once the vibration mounting is assembled as shown in Figures 1 and 2, the base will be secured to any suitable support, as a frame, floor or bracket, as by bolts in the lugs 30. The base will normally be horizontal and the hub will be above the base with the bolt vertical. Of course in special cases other angular positions to the horizontal may be used. The instrument or device is mounted on the hub by securing to the bolt. Normally the instrument or device will be placed on top of the hub, but in special cases the instrument or device may be placed below the hub, either by reversing the bolt and mounting the instrument or device on the bolt below the hub and base, or by securing it on the threaded end 25 of the bolt.

When vibration occurs, the resultant force will normally be at some angle to the vertical and horizontal planes and will produce components in the three standard planes. The effect will be to make the hub move toward the base at at least some position or positions around the circumference, and this will cause the rib on the hub to apply load to the roll-shear gaskets at some portion of the circumference in a direction which may be axially toward the base or at some angle thereto, making one or both of the roll-shear gaskets tend to roll. As the gasket or gaskets roll they are distorted out of round, and work is done on the gasket which absorbs energy of vibration. The roll-shear action makes the skirts of at least one of the gaskets rotate about the axis of the cross section of the gasket and engage the ribs from which the skirts are normally spaced, and the engagement of the ribs tends to snub further roll-shear action by restricting the distortion. Thus the engagement of the skirts with the ribs adjoining the shoulders creates a restoring force.

Insofar as an axial component causes the hub to move bodily toward the base, air in the well 42 is trapped due to the sealing of the gasket rings and is compressed by the relative movement of the hub toward the base. This also creates a restoring force.

In case impact or shock load occurs, creating an unusual axial movement of the hub toward the base, the annular wedge or tapered surface 48 on the hub extension 47 encounters the annular wedge surface 53 on the shock pad, tending to distort the shock pad outwardly and absorbing the shock load. In case the axial movement of the hub toward the base is great enough so that the shock pad on the flat surface 55 and on the inwardly extending ring portion 56 engages the hub, the shock pad will also be deformed by these engagements to absorb the shock load.

The invention is by no means limited to the employment of two roll-shear gaskets at the same axial position. Any suitable number may be used, for example four. In Figures 3 and 4 I illustrate a vibration mounting using four roll-shear gasket rings, by adding an extra annular rib 31' outside the rib 31 on the hub 20', providing an extra outwardly directed shoulder 37' on a rib 36' (similar to rib 36) and providing an inwardly directed annular shoulder 38' on an extra radially displaced circumferential rib 36' on the base. In effect the extra shoulders thus provided duplicate on a larger diameter the structure shown in Figures 1 and 2 and provide an extra air compression well 42 sealed by the roll-shear gaskets 43' and 44' which may desirably be like those shown in Figures 1 and 2, but of larger diameters. If desirable the extra gaskets may be made of rubberlike material of a different durometer from the inner gaskets, for example a softer durometer, or all of the gaskets may be made of progressively variant durometers.

In operation the form of Figures 3 and 4 will be similar to that of Figures 1 and 2 except that there are four instead of two roll-shear gaskets at the same axial position, one within another and of different diameters.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my invention.

Having thus described my invention what I claim as new and desire to secure by Letters Patent is:

1. In a vibration mounting, a hub having an axially directed annular rib provided with inwardly and outwardly directed circular shoulders and a narrow annular projecting portion extending beyond the shoulders on the hub, a base having a plurality of axially directed annular ribs cooperating with the rib on the hub, directed oppositely to the rib on the hub, provided with radial inner and outer shoulders respectively inside and outside the rib on the hub and a narrow annular projecting portion extending beyond the shoulders on the base, a plurality of rubber-like annular concentric roll-shear gaskets of generally circular cross-section of different diameters and at the same axial position, one with another, one engaged and squeezed between the shoulder on the outside of the inner rib on the base and the shoulder on the inside of the rib on the hub and the other engaged and squeezed between the shoulder on the outside of the rim on the hub and the shoulder on the inside of the outer rim on the base and axially extending skirts on the gaskets normally free from engagement with the ribs and adapted to engage the respective ribs when the gaskets roll.

2. In a vibration mounting, a hub having an axially extending annular rib provided with inwardly and outwardly directed circular shoulders on opposite sides of the ribs and a narrow annular projecting portion extending beyond the shoulders on the hub, a base cooperating with the hub having a plurality of axially extending annular ribs directed oppositely to the rib on the hub, respectively inside and outside the rib on the hub, and having respectively outwardly and inwardly directed annular shoulders of circular cross sectional contour and a narrow annular projecting portion beyond the shoulders on the base, the respective narrow annular projecting portions tapering from the outer ends of the projecting portions, annular concentric rubber-like roll-shear gaskets of different diameters, at the same axial position and of generally circular cross section arranged one within another, the inner of the gaskets being engaged and squeezed between the outer shoulder on the inner rib on the base and the inner shoulder on the rib on the hub and an outer gasket being engaged and squeezed between the outer shoulder on the rib on the hub and the inner shoulder on the outer rib on the base, and annular rubber-like skirts on the gaskets extending in the two opposite axial directions each along and normally in spaced relation from one of the ribs and adapted on rolling of the gaskets to engage the respective ribs.

3. In a vibration mounting, a hub having an axially extending annular rib provided with inwardly and outwardly directed circular shoulders and a narrow annular projecting portion extending beyond the shoulders on the hub, a base having an air-tight well directed oppositely to the rib on the hub and inner and outer annular axially extending ribs on opposite sides of the well, one inside and one outside of the rib on the hub, the inner rib on the base having an outwardly extending shoulder and the outer rib on the base having an inwardly extending shoulder and the ribs on the base having narrow annular projecting portions extending beyond the shoulders on the base, annular concentric rubber-like roll-shear gaskets of different diameters and of generally circular cross section arranged one within another, the inner gasket being engaged between the shoulder on the outside of the inner rib on the base and the shoulder on the inside of the rib on the hub and the outer gasket being engaged between the shoulder on the outside of the rib on the hub and the shoulder on the inside of the outer rib on the base, and oppositely axially directed annular skirts of rubber-like material on the gaskets extending along but normally in spaced relation from the respective ribs, whereby compression of air in the well supplements the restoring force exerted by the skirts.

4. In a vibration mounting, a hub having annular shoulders of different diameters, a base having oppositely directed internesting cooperating inwardly and outwardly directed annular shoulders of different diameters from those on the hub, annular concentric rubber-like roll-shear gaskets of different diameters, each engaged between a shoulder on the base and a shoulder on the hub, annular opposite axially directed skirts of rubber-like material on the gasket extending normally in spaced relation from walls of the hub and the base respectively, and adapted to engage the same when roll-shear takes place, an annular axially directed tapering surface on the hub, a recess on the base in line with the tapering surface on the hub and an annular rubber-like shock pad in the recess having an annular tapering surface engaged by the annular tapering surface on the hub and wedged outwardly to absorb shock.

References Cited in the file of this patent
UNITED STATES PATENTS

| Number | Name | Date |
|---|---|---|
| 2,115,713 | Haire | May 3, 1938 |
| 2,126,707 | Schmidt | Aug. 16, 1938 |
| 2,138,175 | Keys | Nov. 29, 1938 |
| 2,179,959 | Schroedter | Nov. 14, 1939 |
| 2,356,246 | Jones | Aug. 22, 1944 |
| 2,560,620 | Whittam | July 17, 1951 |